(12) United States Patent
Lambert et al.

(10) Patent No.: US 12,479,591 B2
(45) Date of Patent: Nov. 25, 2025

(54) SYSTEM FOR CONDITIONING FUEL FOR SUPPLYING AN AIRCRAFT TURBOMACHINE, AIRCRAFT AND METHOD OF USE

(71) Applicant: SAFRAN, Paris (FR)

(72) Inventors: Pierre-Alain Marie Cyrille Lambert, Moissy-Cramayel (FR); Hugo Pierre Mohamed Jouan, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/703,042

(22) PCT Filed: Oct. 13, 2022

(86) PCT No.: PCT/EP2022/078543
§ 371 (c)(1),
(2) Date: Apr. 19, 2024

(87) PCT Pub. No.: WO2023/072614
PCT Pub. Date: May 4, 2023

(65) Prior Publication Data
US 2024/0417100 A1 Dec. 19, 2024

(30) Foreign Application Priority Data
Oct. 25, 2021 (FR) ........................... 2111281

(51) Int. Cl.
*B64D 37/34* (2006.01)
*B64D 37/30* (2006.01)
(Continued)

(52) U.S. Cl.
CPC ............. *B64D 37/34* (2013.01); *B64D 37/30* (2013.01); *F02C 6/10* (2013.01); *F02C 7/224* (2013.01);
(Continued)

(58) Field of Classification Search
CPC ...... B64D 37/00; B64D 37/005; B64D 37/30; B64D 37/34; B64D 2041/005;
(Continued)

(56) References Cited

U.S. PATENT DOCUMENTS

| 8,216,728 B2 * | 7/2012 | Konrad | H01M 8/04141 429/415 |
| 10,490,832 B2 * | 11/2019 | Manabe | F02C 3/04 |

(Continued)

OTHER PUBLICATIONS

International Search Report for PCT/EP2022/075543, dated Feb. 6, 2023, 2 pages.
French Search Report for FR2111281, dated Jun. 8, 2022, 2 pages.

*Primary Examiner* — Alain Chau
(74) *Attorney, Agent, or Firm* — RANKIN, HILL & CLARK LLP

(57) ABSTRACT

A fuel conditioning system configured to supply a turbomachine with fuel from a cryogenic tank, the conditioning system comprising a fuel circuit connected at the inlet to the cryogenic tank and at the outlet to the turbomachine, a pump, a fuel cell configured to provide electricity to an electrical network of the aircraft, at least a first heat exchanger belonging to the fuel circuit and configured to transmit calories from the fuel cell to the fuel flow in order to heat it, and at least one second heat exchanger mounted downstream of the first heat exchanger in the fuel circuit and configured to transmit calories from the turbomachine to the fuel flow in order to heat it.

11 Claims, 6 Drawing Sheets

(51) Int. Cl.
*B64D 41/00* (2006.01)
*F02C 3/22* (2006.01)
*F02C 6/10* (2006.01)
*F02C 7/224* (2006.01)

(52) U.S. Cl.
CPC .......... *B64D 2041/005* (2013.01); *F02C 3/22* (2013.01); *F05D 2220/323* (2013.01); *F05D 2220/75* (2013.01); *F05D 2260/213* (2013.01)

(58) Field of Classification Search
CPC .... F02C 7/224; F02C 3/20; F02C 3/22; F02C 9/40; F02C 6/06; F02C 6/08; H01M 2250/20; H01M 8/04111
See application file for complete search history.

(56) References Cited

U.S. PATENT DOCUMENTS

| | | | |
|---|---|---|---|
| 10,654,583 B2 * | 5/2020 | Pollard | B64D 37/32 |
| 11,187,156 B2 * | 11/2021 | Niergarth | B01D 19/0005 |
| 11,511,872 B2 * | 11/2022 | Staubach | B64D 41/00 |
| 11,724,815 B2 * | 8/2023 | Mackin | B64D 27/24 |
| | | | 60/801 |
| 11,909,079 B2 * | 2/2024 | Morrison | H01M 8/04 |
| 11,912,416 B2 * | 2/2024 | Quartarone | H01M 8/222 |
| 2010/0009226 A1 * | 1/2010 | Konrad | H01M 8/04014 |
| | | | 429/415 |
| 2011/0048026 A1 | 3/2011 | Hoffjann et al. | |
| 2012/0240599 A1 * | 9/2012 | Stolte | B64D 13/08 |
| | | | 62/89 |
| 2013/0036722 A1 * | 2/2013 | Hashenas | F02C 7/224 |
| | | | 60/39.83 |
| 2014/0102105 A1 * | 4/2014 | Janapaneedi | F02C 3/34 |
| | | | 60/39.5 |
| 2015/0337730 A1 | 11/2015 | Kupiszewski et al. | |
| 2016/0036071 A1 * | 2/2016 | Klewer | H01M 8/04044 |
| | | | 429/435 |
| 2018/0053950 A1 * | 2/2018 | Buehler | H01M 8/04268 |
| 2018/0354643 A1 * | 12/2018 | Pollard | B64D 37/32 |
| 2020/0088098 A1 * | 3/2020 | Roberge | F02C 7/16 |
| 2020/0088102 A1 * | 3/2020 | Roberge | F02C 7/224 |
| 2021/0207540 A1 * | 7/2021 | Roberge | F02C 9/40 |
| 2021/0300575 A1 * | 9/2021 | Staubach | B64D 27/24 |
| 2022/0052361 A1 * | 2/2022 | Morrison | H01M 8/04014 |
| 2022/0297844 A1 * | 9/2022 | Mackin | B64D 27/24 |
| 2023/0069975 A1 * | 3/2023 | Quartarone | B64D 13/08 |

* cited by examiner

SYSTEM FOR CONDITIONING FUEL FOR SUPPLYING AN AIRCRAFT TURBOMACHINE, AIRCRAFT AND METHOD OF USE

TECHNICAL FIELD

This invention relates to the field of aircrafts comprising turbomachines supplied by fuel stored in a cryogenic tank.

It is known to store fuel, in particular hydrogen, in liquid form to limit the overall dimension and the weight of the tanks of the aircraft. For example, the fuel is stored at a temperature of around 20 to 22 Kelvin (−253 to −251° C.) in a cryogenic tank on the aircraft.

In order to be injected into the combustion chamber of a turbomachine, the fuel must be conditioned, i.e. pressurised and heated, to ensure an optimum combustion. Conditioning is required, for example, to reduce the risk of icing of the water vapour contained in the air circulating in the turbomachine, in particular at the level of the fuel injectors of the turbomachine.

With reference to [FIG. 1], a prior art conditioning system is shown comprising a fuel circuit 100 connected at the inlet to a cryogenic tank R1 and at the outlet to the combustion chamber CC of a turbomachine T. A fuel flow Q circulating from upstream to downstream in the fuel circuit 100 successively passes through a mechanical pump 101 drawing off the fuel in liquid phase and a heating module 102.

The use of a heating module 102 requires energy to operate, which lowers the efficiency of the conditioning system. It has been proposed in the prior art to use a heating module 102 which extracts calories from the turbomachine T. In practice, the calories generated by the turbomachine T are not sufficient to heat the fuel flow Q without penalising its efficiency. In addition, the calories generated depend on the speed of the turbomachine T.

The invention aims to eliminate at least some of these disadvantages by proposing a new fuel conditioning system allowing a heating with a greater efficiency and operability.

The patent applications US2021/207540A1, US2011/048026A1 and US2015/337730A1 teaching a turbomachine associated with a fuel cell are known in the prior art.

SUMMARY

The invention relates to a fuel conditioning system configured to supply a turbomachine configured to ensure the propulsion of an aircraft, referred to as turbomachine, with fuel coming from a cryogenic tank, the conditioning system comprising:
- a fuel circuit connected at the inlet to the cryogenic tank and at the outlet to the turbomachine,
- a pump configured to circulate a fuel flow from upstream to downstream in the fuel circuit,
- a fuel cell configured to provide electricity to an electrical network of the aircraft,
- at least one first heat exchanger belonging to the fuel circuit and configured to transmit calories coming from the fuel cell to the fuel flow in order to heat it, and
- at least one second heat exchanger, mounted downstream of the first heat exchanger in the fuel circuit, configured to transmit calories coming from the turbomachine to the fuel flow in order to heat it.

This invention takes advantage of a fuel cell to condition fuel stored in a cryogenic tank. A fuel cell uses fuel to generate electrical energy that can be used by the turbomachine and/or the aircraft. In practice, the fuel cell has an efficiency of around 50% and also generates a significant amount of calories, which is traditionally dissipated by an air flow from outside. Thanks to the invention, the calories generated are advantageously used to condition the cryogenic fuel used for the aircraft turbomachine so that it can be consumed optimally. In addition, a fuel cell has a high efficiency at constant speed, allowing to generate calories for reheating independently of the speed of the aircraft turbomachine.

In addition, in the prior art, the heat transfer fluid of a fuel cell was cooled by an air flow from outside the aircraft by means of a large radiator, which created a significant drag for the aircraft. Thanks to the invention, the radiator can be eliminated or its dimensions reduced. The interactions with the outside airflow is reduced and the drag is minimised.

By using two heat exchangers in series, the fuel is heated in stages in the fuel circuit. The degree of freedom introduced by the presence of two heat exchangers means that the temperature of the fuel arriving at the turbomachine can be controlled under all operating conditions, even if the fuel cell is operating at constant speed. Series heating of this kind also provides better protection against the risk of water vapour condensing in the vicinity of the hydrogen.

Preferably, the conditioning system comprises a heat transfer fluid circuit in which a heat transfer fluid for cooling the fuel cell circulates, the first heat exchanger belonging to the heat transfer fluid circuit. In this way, the heat transfer fluid circuit allows the calories from the fuel cell to be transferred directly to the fuel, which increases compactness and reduces mass.

Preferably, the conditioning system comprises a bypass duct allowing to supply fuel to the second heat exchanger without supplying the first heat exchanger. Advantageously, this allows to regulate the heating of the fuel when fuel requirements increase during a flight phase. Advantageously, the speed of the fuel cell remains constant and the bypass duct allows to ensure that the fuel is heated optimally despite the increased fuel flow. This is particularly advantageous when the fuel cell is supplied from the fuel circuit.

Preferably, the bypass duct comprises a bypass valve which allows the amount of fuel which is provided directly to the first heat exchanger and directly to the second heat exchanger to be regulated. The bypass valve is preferably controlled as a function of the fuel flow rate and/or the temperature of the fuel leaving the first heat exchanger.

Preferably, the fuel cell is supplied by the fuel circuit, in particular by a fraction of the fuel flow previously heated by the first heat exchanger. Using a fuel cell also has the advantage of using the fuel directly from the cryogenic tank, making the fuel cell autonomous and simplifying the conditioning system.

According to one aspect of the invention, the heat transfer fluid circuit comprises a load-shedding branch, hereinafter referred to as the "primary load-shedding branch", comprising a heat exchanger, hereinafter referred to as the "primary load-shedding exchanger", which allows to reduce the heat input provided to the first heat exchanger. When the fuel cell generates too many calories at its constant, high-efficiency speed, excessive heating of the fuel is avoided.

Preferably, the primary load-shedding branch also comprises a primary load-shedding valve which allows to regulate the quantity of heat transfer fluid provided to the first heat exchanger and to the primary load-shedding exchanger.

Preferably, the conditioning system comprises a heating circuit in which a heat transfer fluid coming from the turbomachine circulates, for example, an air flow collected downstream of a compression phase, a flow of burnt gases collected downstream of a turbine, or a lubricating fluid. In this way, the secondary heating takes place as close as possible to the turbomachine.

Preferably, the heating circuit comprises a load-shedding branch, hereinafter referred to as the "secondary load-shedding branch", comprising a heat exchanger, hereinafter referred to as the "secondary load-shedding exchanger", which allows to regulate the heat input to the second heat exchanger.

According to one aspect of the invention, the conditioning system comprises an air supply duct which connects the turbomachine to the fuel cell in order to supply the fuel cell with a flow of pressurised air coming from the turbomachine. This allows to avoid the need for a dedicated compressor for the fuel cell, which reduces the mass and the overall dimension.

Preferably, the air supply duct comprises an auxiliary branch which comprises an auxiliary heat exchanger so as to regulate the temperature of the air flow provided to the fuel cell. This allows to improve the efficiency of the fuel cell.

Preferably, the fuel circuit comprises an auxiliary branch that allows calories to be exchanged with the auxiliary branch of the air supply duct by means of the auxiliary exchanger. The temperature is controlled as close as possible to the turbomachine, in synergy with the other items of equipment in the conditioning system.

In one preferred aspect, the turbomachine is mechanically connected to a propulsion member.

Preferably, the conditioning system comprises a propulsion member and a drive system for driving said propulsion member, the drive system being configured to be supplied by the turbomachine and by the fuel cell.

Preferably, the fuel is dihydrogen. This is particularly advantageous for a hydrogen-powered fuel cell.

The invention also relates to an assembly of a turbomachine and of a conditioning system as described above. The invention also relates to an aircraft comprising a turbomachine and a conditioning system as described above.

The invention also relates to a method for supplying fuel to a turbomachine configured to ensure the propulsion of an aircraft, referred to as turbomachine, from fuel coming from a cryogenic tank, the aircraft comprising a conditioning system as presented previously, the method comprising steps consisting in:
- circulating a fuel flow from upstream to downstream in the fuel circuit by means of the pump to supply the turbomachine,
- providing electricity to the electrical network of the aircraft by means of the fuel cell.
- transmitting calories coming from the fuel cell to the fuel flow Q in order to heat it by means of the first exchanger, and then
- transmitting calories coming from the turbomachine T to the fuel flow Q in order to heat it by means of the second heat exchanger.

DESCRIPTION OF THE DRAWINGS

The invention will be better understood on reading the following description, given by way of example, with reference to the following figures, given by way of non-limiting examples, in which identical references are given to similar objects.

It should be noted that the figures set out the invention in detail in order to implement the invention, said figures of course being able to be used to better define the invention if necessary.

DETAILED DESCRIPTION

Figure 1:
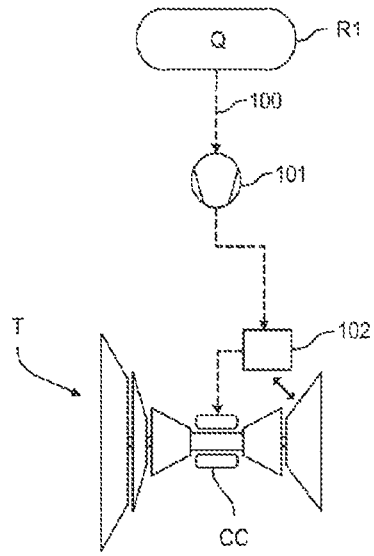
FIG. 1 is a schematic representation of a fuel conditioning system according to the prior art.
Figure 2:
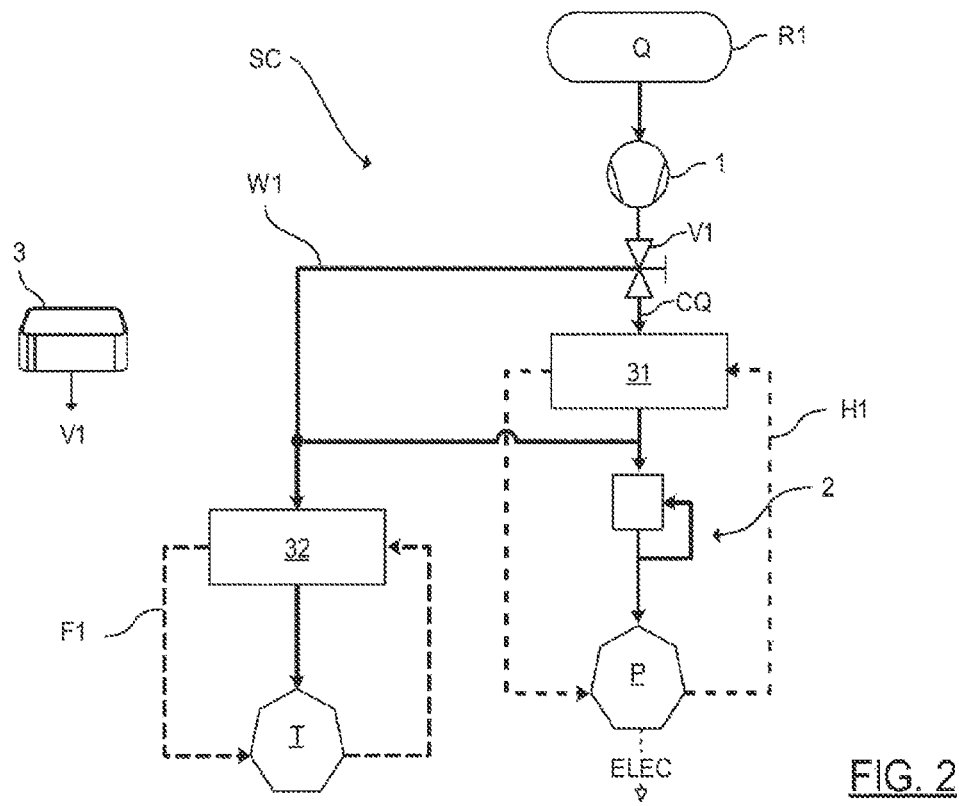
FIG. 2 is a schematic representation of a fuel conditioning system according to a first embodiment of the invention.

With reference to [FIG. 2], a fuel conditioning system SC is shown, configured to supply an aircraft turbomachine, referred to as turbomachine T, with fuel Q coming from a cryogenic tank R1. The turbomachine T is configured to ensure the propulsion of the aircraft, in particular by driving at least one propulsion member (not shown in [FIG. 2]).

In this example, the fuel is liquid hydrogen, but the invention is applicable to other types of fuel, for example liquid methane or liquefied natural gas.

According to a first embodiment, with reference to [FIG. 2], the conditioning system SC comprises a fuel circuit CQ (continuous line on [FIG. 2]) connected at the inlet to the cryogenic tank R1 and at the outlet to the turbomachine T. The conditioning system SC also comprises a pump 1, preferably a high-pressure pump, configured to circulate a fuel flow Q from upstream (inlet) to downstream (outlet) in the fuel circuit CQ. The pump 1 is sized to deliver a sufficient pressure to supply the turbomachine T, taking into account the pressure drops in the fuel circuit CQ.

With reference to [FIG. 2], the conditioning system SC comprises:
- a first heat exchanger 31 configured to transmit calories coming from a fuel cell P to the fuel flow Q extracted by the pump 1 in order to heat it, and
- a second heat exchanger 32, mounted downstream of the first heat exchanger 31, configured to transmit calories coming from the turbomachine T to the fuel flow Q in order to heat it so that it can be injected optimally into the turbomachine T.

Such heating is advantageous because it takes advantage of the heat generated by the fuel cell P and the turbomachine T.

In this example, the fuel cell P is configured to generate, on the one hand, electrical energy ELEC and, on the other hand, calories which are collected in the fuel cell P by a heat transfer fluid circuit HL. Preferably, the electrical energy ELEC is intended for the electrical network of the aircraft. In this example, the fuel cell P is a PEM cell, i.e. it has a proton-emitting membrane.

Advantageously, the heat transfer fluid circuit H1 is used to transfer the calories from the fuel cell P to the fuel circuit CQ via the first heat exchanger 31. In practice, the fuel cell P has an efficiency of around 50% and generates a large amount of calories, which is used to efficiently heat the fuel Q in the fuel circuit CQ. The transfer of calories within the first heat exchanger 31 allows to cool the heat transfer fluid in the fuel cell P, which can then collect again the calories within the fuel cell P.

In the prior art, the heat transfer fluid in a fuel cell P was cooled by a flow of air from outside the aircraft by means of a large radiator, which created a significant drag on the aircraft. Thanks to the invention, the radiator can be eliminated or its dimensions reduced. The interactions with the outside airflow are reduced and the drag is minimised.

In this example, with reference to [FIG. 2], the fuel cell P is supplied directly by the fuel circuit CQ and is therefore autonomous, which simplifies the conditioning system SC. The fuel cell P is supplied with a fraction of the fuel flow Q previously heated by the first exchanger 31, in particular hydrogen. In this example, the conditioning system SC comprises a pressure regulator 2, in particular an expansion valve, configured to supply the fuel cell P with a fuel flow Q at a constant pressure and flow rate. In this way, the fuel cell P is optimally supplied with fuel Q. In this example, the fuel cell P is supplied with dioxygen taken from the ambient air.

Preferably, the fuel cell P operates at a constant (stationary) speed. Its speed is preferably determined to provide a quantity of electrical energy with the best efficiency. Advantageously, the calories of the fuel cell P does not depend on the speed of the turbomachine T. Preferably, the fuel cell P is dimensioned only to provide non-propulsive energy and not from a thermal point of view. Advantageously, even if the fuel cell P fails, the conditioning system S remains operational.

The second heat exchanger 32 is supplied with calories coming from the turbomachine T, in particular coming from a heating circuit F1 in which a heat transfer fluid coming from the turbomachine T circulates, for example, an exhaust air flow from a compression phase or a lubricating fluid. The number of calories thus depends on the speed of the turbomachine T. The fuel Q is thus heated, on the one hand, by the first exchanger 31 and, on the other hand, by the second exchanger 32. These successive heating allow the fuel to be brought up to temperature in a compact way, benefiting from a large number of calories coming from the fuel cell P.

With reference to [FIG. 2], the conditioning system SC also comprises a bypass duct W1 allowing the second heat exchanger 32 to be supplied without supplying the first heat exchanger 31. To this end, the bypass duct W1 comprises an upstream end connected to the fuel circuit CQ upstream of the first heat exchanger 31 and a second downstream end connected downstream of the first heat exchanger 31, in particular upstream of the second heat exchanger 32. The bypass duct W1 also comprises a bypass valve V1 which allows to regulate the quantity of fuel Q provided directly to the first heat exchanger 31 and directly to the second exchanger 32. Preferably, the bypass valve V1 is controlled by a computer 3 in order to determine the quantity of fuel Q circulating in the first heat exchanger 31, this allows to regulate the temperature of the fuel Q provided to the fuel cell P to allow an optimum operation independently of the fuel requirements of the turbomachine T.

Preferably, the control of the bypass valve V1 is a function of at least the speed of the turbomachine T and the requirements of fuel Q. At nominal speed of the turbomachine T, the bypass valve V1 is closed. When the speed of the turbomachine T is higher than its nominal speed, the bypass valve V1 is opened and a fraction of the fuel Q is conveyed to the second heat exchanger 32, while the speed of the fuel cell P remains constant.

Figure 8:
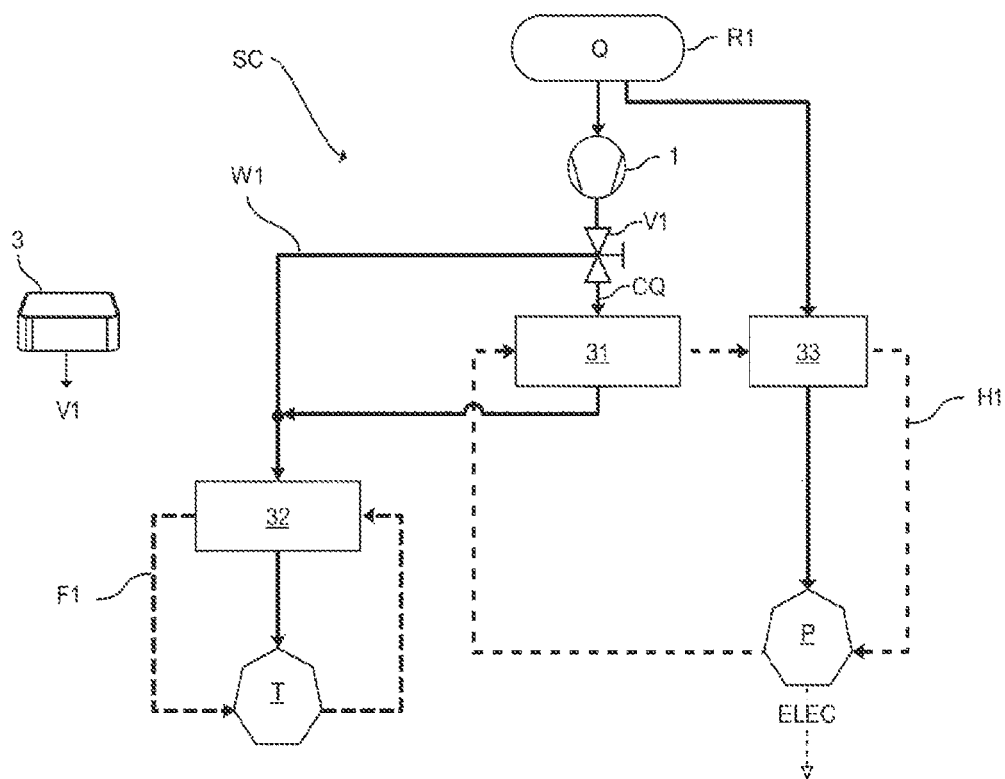
FIG. 8 is a schematic representation of a fuel conditioning system according to a variant of the first embodiment of the invention.

According to a variant of the first embodiment, with reference to [FIG. 8], the fuel cell P is supplied with fuel taken upstream of the pump 1. This allows to avoid the need to expand the fuel Q again either with a turbine, which adds complexity, or with a valve whose thermodynamic efficiency is low.

Still referring to [FIG. 8], the conditioning system S comprises a complementary heat exchanger 33 which belongs to the heat transfer fluid circuit H1 for heating the fuel Q. Preferably, the first heat exchanger 31 and the complementary heat exchanger 33 are connected in series in the heat transfer fluid circuit H1. Preferably, the additional heat exchanger 33 is mounted upstream of the fuel cell P and downstream of the first heat exchanger 31 in order to optimally heat the fuel Q dedicated to the fuel cell P.

Figure 3:
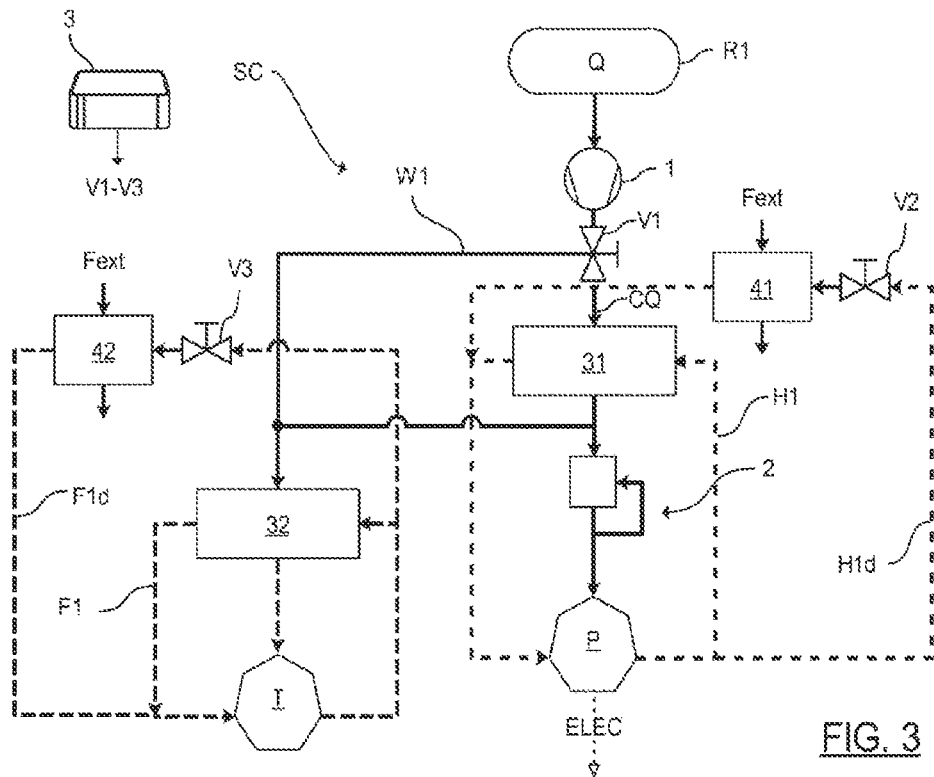
FIG. 3 is a schematic representation of a fuel conditioning system according to a second embodiment of the invention with several load-shedding branches.

With reference to [FIG. 3], a second embodiment of the fuel conditioning system SC is shown. For the sake of clarity and conciseness, the elements that are common or similar to the first embodiment are not presented again.

As indicated previously, the first heat exchanger 31 is configured to heat the fuel Q from the calories coming from the fuel cell P. In practice, the number of calories generated by a fuel cell P, intended to supply an electrical network of an aircraft, may be greater than the heating requirements of the fuel Q. In order to maintain an optimum generation of electrical energy ELEC, the heat transfer fluid circuit H1 comprises a load-shedding branch H1$d$, hereinafter referred to as the "primary load-shedding branch H1$d$", comprising a heat exchanger 41, hereinafter referred to as the "primary load-shedding exchanger 41", which allows to reduce the heat input to the first heat exchanger 31.

To this end, the primary load-shedding branch H1$d$ comprises an upstream end connected to the heat transfer fluid circuit H1 upstream of the first heat exchanger 31 and a second downstream end located downstream of the first heat exchanger 31. The primary load-shedding branch H1$d$ also comprises a load-shedding valve V2, hereinafter referred to as the "primary load-shedding valve V2", which allows to regulate the quantity of heat transfer fluid provided to the first heat exchanger 31 and to the primary load-shedding exchanger 41. Preferably, the primary load-shedding valve V2 is controlled by the computer 3 in order to determine the quantity of heat transfer fluid circulating in the first heat exchanger 31, which allows to regulate the temperature of the fuel Q provided to the second exchanger 32. Preferably, the primary load-shedding valve V2 is controlled as a function of at least the speed of the turbomachine T so as to supply the turbomachine T with an optimally heated fuel Q.

Preferably, an external air flow Fext passes through the primary load-shedding exchanger 41 to extract the calories circulating in the primary load-shedding branch H1$d$. It goes without saying that the primary load-shedding exchanger 41 could be cooled in a different way.

Similarly, still with reference to [FIG. 3], the heating circuit F1 comprises a load-shedding branch F1$d$, hereinafter referred to as the "secondary load-shedding branch F1$d$", comprising a heat exchanger 42, hereinafter referred to as the "secondary load-shedding exchanger 42", which allows to reduce the heat input to the second heat exchanger 32.

To this end, the secondary load-shedding branch F1$d$ comprises an upstream end connected to the heating circuit F1 upstream of the second heat exchanger 32 and a second downstream end positioned downstream of the second heat exchanger 32. The secondary load-shedding branch F1$d$ also comprises a load-shedding valve V3, hereinafter referred to as the "secondary load-shedding valve V3", which allows to regulate the quantity of heat transfer fluid provided to the second heat exchanger 32 and the secondary load-shedding exchanger 42. Preferably, the secondary load-shedding valve V3 is controlled by the computer 3 in order to determine the quantity of heat transfer fluid circulating in the second heat exchanger 32. This allows to regulate the temperature of the fuel Q provided to the turbomachine T. Preferably, the control of the secondary load-shedding valve V3 is a function of at least the speed of the turbomachine T so as to supply the turbomachine T with an optimally heated fuel Q.

Preferably, an external air flow Fext passes through the secondary load-shedding exchanger 42 to extract the calories circulating in the secondary load-shedding branch H1d. It goes without saying that the secondary load-shedding exchanger 42 could be cooled in a different way.

Figure 4:
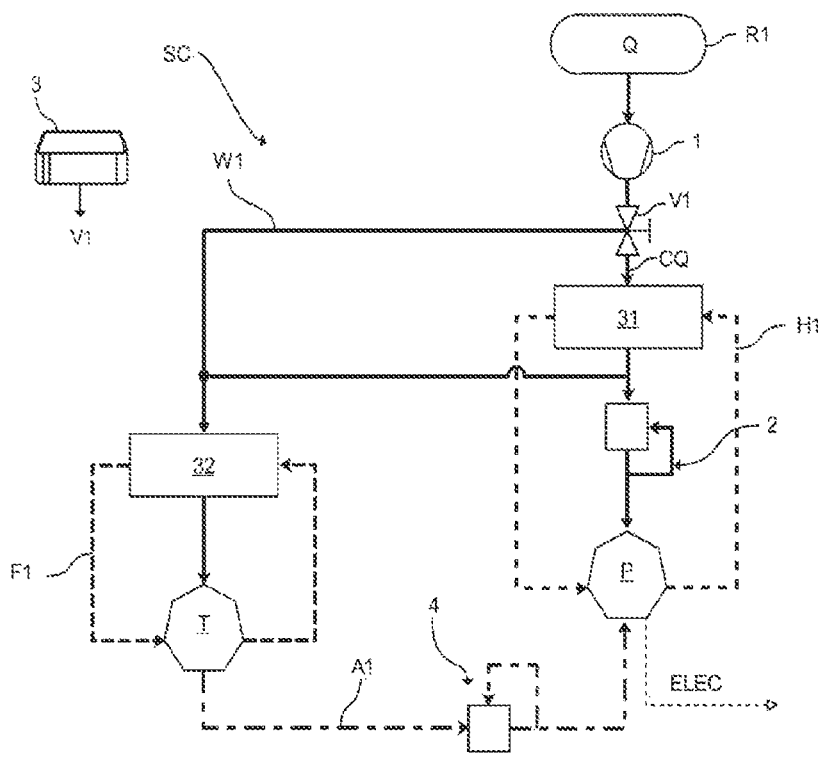
FIG. 4 is a schematic representation of a fuel conditioning system according to a third embodiment of the invention with an air supply duct for supplying air to the fuel cell.

Referring to [FIG. 4], a third embodiment of the fuel conditioning system SC is shown. For the sake of clarity and conciseness, the elements that are common or similar to the first embodiment are not presented again.

As described above, the fuel cell P can be supplied with dioxygen by taking air from its surroundings. For this purpose, an auxiliary compressor dedicated to the fuel cell P is known to be incorporated in order to provide a flow rate of pressurised air to the fuel cell P. Such a compressor is bulky and heavy.

In this third embodiment, in order to improve the performance of the fuel cell P, the fuel cell P is supplied with dioxygen by a flow of air coming from the turbomachine T, in particular from a low-pressure stage of a compressor of the turbomachine T. To this end, as illustrated in [FIG. 4], the conditioning system SC comprises an air supply duct A1 which connects the turbomachine T to the fuel cell P in order to supply the fuel cell P with a flow of pressurised air, for example, at a pressure of one bar (0.1 MPa). The integration of a compressor dedicated to the fuel cell P is no longer necessary.

Preferably, as illustrated in [FIG. 4], the air supply duct A1 comprises a pressure regulator 4, in particular a pressure expansion valve, configured to supply the fuel cell P with a flow of air at constant pressure and flow rate.

According to a variant, the conditioning system SC allows to transmit calories from the air flow, intended for the fuel cell P, to the fuel flow Q intended for the turbomachine T in order to control the temperature of the air flow provided to the fuel cell P. With reference to [FIG. 5], the air supply duct A1 comprises an auxiliary branch A1a that comprises a heat exchanger 43, subsequently referred to as an auxiliary exchanger 43, the fuel circuit CQ comprises an auxiliary branch A1a which allows calories to be exchanged with the auxiliary branch A1a of the air supply duct A1 by means of the auxiliary exchanger 43.

Preferably, the fuel cell P is supplied with air by an electric compressor, in particular one belonging to the air supply duct A1, to allow the fuel cell P to be placed as close as possible to the tank R1 and to shorten the length of the lines. This means that either the fuel cell P has its own air supply, or the fuel cell P is supplied by the electric compressor.

Figure 5:
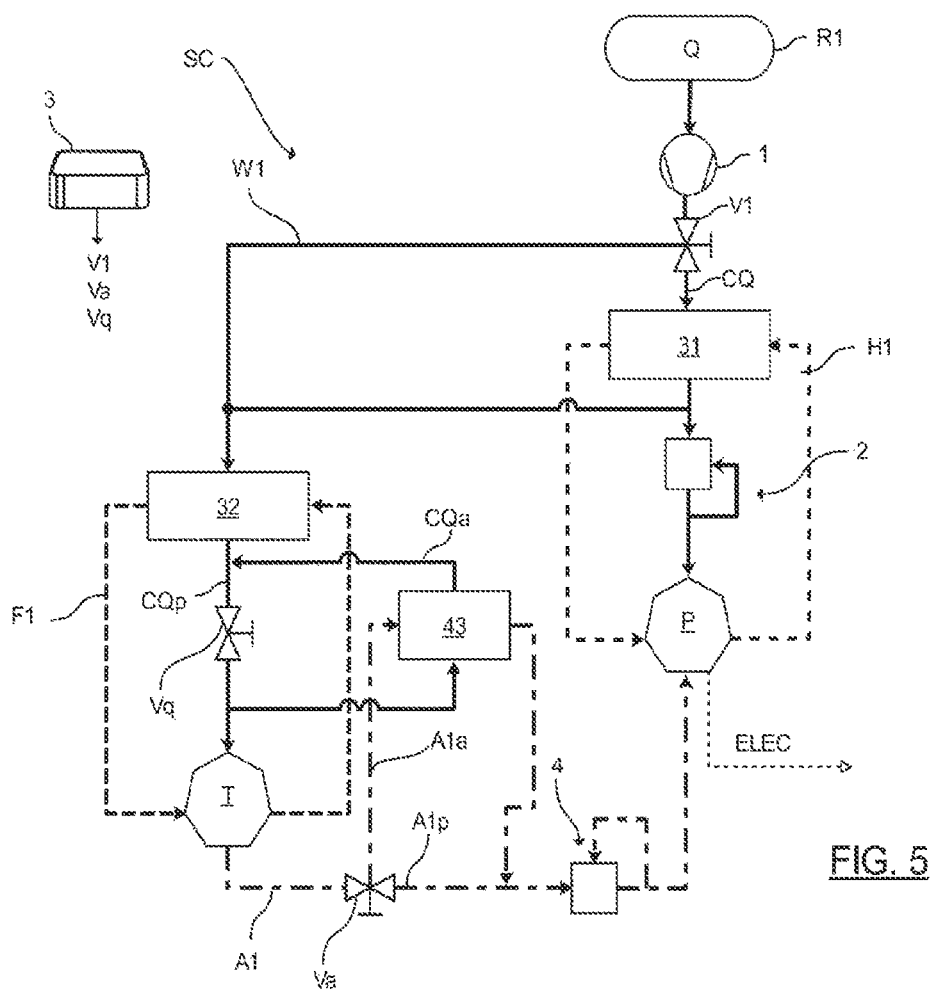
FIG. 5 is a schematic representation of a fuel conditioning system according to a variant of the third embodiment of [FIG. 4]

As illustrated in [FIG. 5], the second exchanger 32 is connected to the turbomachine T, on the one hand, by a main branch Cqp with no heat exchanger and, on the other hand, by the auxiliary branch CQa comprising the auxiliary exchanger 43. An auxiliary fuel valve Vq allows to regulate the quantity of fuel provided to the auxiliary exchanger 43. In other words, the auxiliary fuel valve Vq is used to control the quantity of fuel Q in the main branch CQp and the auxiliary branch CQa.

In a similar way, the turbomachine T is connected to the fuel cell P, on the one hand, by a main branch A1p with no heat exchanger and, on the other hand, by the auxiliary branch A1a comprising the auxiliary exchanger 43. An auxiliary air valve Va allows to regulate the amount of air provided to the auxiliary exchanger 43. In other words, the auxiliary air valve Va is used to control the quantity of air in the main branch A1p and the auxiliary branch A1a.

Preferably, one or more auxiliary valves Va, Vq are controlled by the computer 3 so as to regulate the temperature of the fuel Q provided to the turbomachine T and the temperature of the air provided to the fuel cell P. Of course, a single auxiliary valve Va, Vq could be used.

Figure 6:
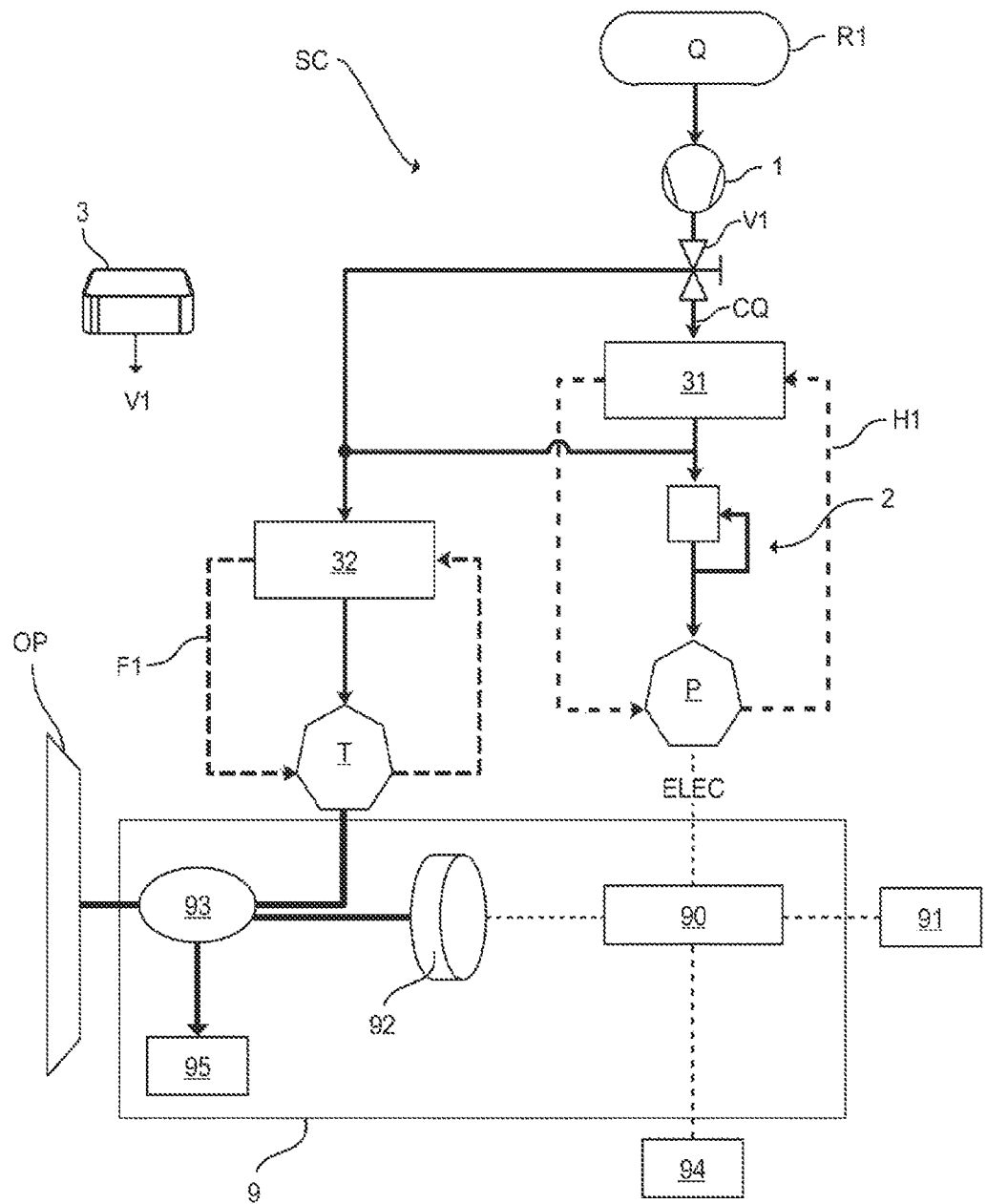
FIG. 6 is a schematic representation of a fuel conditioning system according to a fourth embodiment of the invention for providing a propulsive and non-propulsive energy.

With reference to [FIG. 6], a fourth embodiment of the fuel conditioning system SC is shown. For the sake of clarity and conciseness, the elements that are common or similar to the first embodiment are not presented again.

In this embodiment, the turbomachine T is connected to a propulsion member OP which it drives, for example a propeller or a fan.

With reference to [FIG. 6], the fuel conditioning system SC comprises a propulsion member OP and a drive system 9 for driving said propulsion member OP. The drive system 9 is configured to be supplied by the turbomachine T and by the fuel cell P. In this way, advantage is taken of the energy generated by the fuel cell P to assist propulsion. This enables to size the turbomachine T.

The fuel cell P is connected to an electrical network 90 and is supplied with electrical energy ELEC. In this example, the electrical network 90 is used to supply several electrical members 91, for example non-propulsive loads such as wing anti-icing or cabin pressurisation, or propulsive loads as described below. Preferably, at least one electrical battery 94 is provided to allow excess electrical energy to be stored or to provide additional electrical power when the turbomachine T is changing speed.

In the example shown in [FIG. 6], the drive system 9 comprises at least one electric motor 92, supplied by the electrical network 90, in order to convert electrical power into mechanical torque. The drive system 9 also comprises a gearbox 93 configured to provide an overall mechanical torque to the propulsion member OP from the mechanical torques of the electric motor 92 and of the turbomachine T. Optionally, the gearbox 93 can provide mechanical energy to other non-propulsive mechanical consumers 95, for example a lubrication oil pump or a hydraulic fluid pump for flight control actuation.

The various embodiments have already been described independently with reference to FIGS. 2 to 6. However, it goes without saying that the embodiments can be combined together. [FIG. 7] shows an example of a combination of the different embodiments described above.

The fuel cell P can be positioned as close as possible to the cryogenic tank R1, so that the portion of the fuel circuit located between the heat exchangers 31, 32 remains permanently at a temperature that does not require complex cooling, which is advantageous in the case of a turbojet engine. Conversely, if the turbomachine T is a turboprop engine, a turbofan or an "Open Rotor" type engine, the fuel cell P can be mounted in a nacelle of the turbomachine T, so that the load-shedding exchangers 41, 42 can benefit from the outside air flow delivered by the thruster (propeller or fan) or by a low-pressure compressor stage, with a view to making it more compact and more efficient over a wide range of operating conditions.

Figure 7:
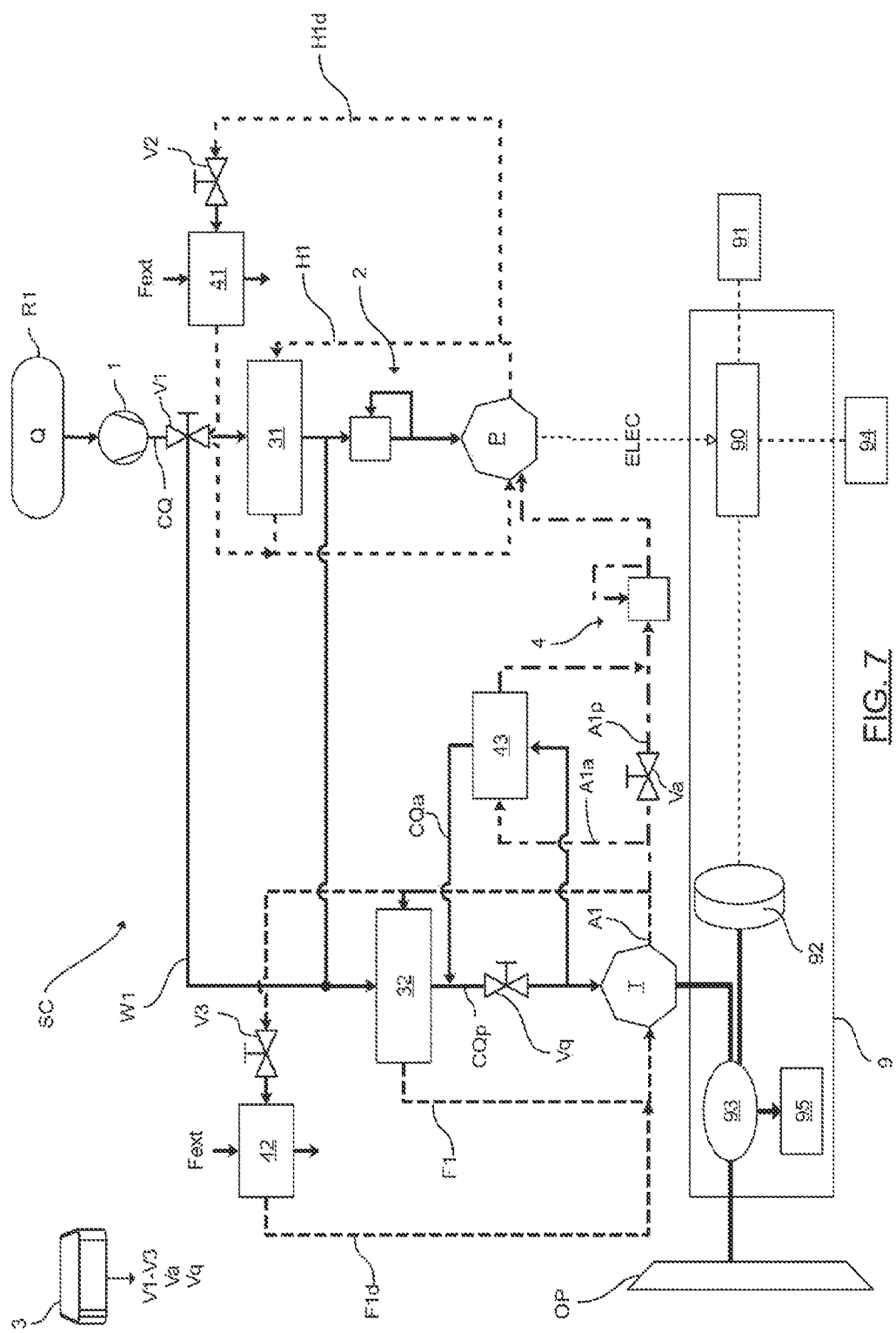
FIG. 7 is a schematic representation of an example of a fuel conditioning system combining several aspects of different embodiments of the invention.

An example of the implementation of the invention will be presented with reference to [FIG. 7]. In this example, the fuel cell P operates at a predetermined constant high-efficiency speed to provide electrical energy ELEC to the electrical network 90 of the aircraft.

The method for supplying fuel to the turbomachine T comprises steps consisting in circulating a fuel flow Q from upstream to downstream in the fuel circuit CQ by means of the pump 1 to supply the turbomachine T and in providing electricity ELEC to the electrical network 90 of the aircraft by means of the fuel cell P.

The fuel cell P is supplied with a fraction of the fuel heated by the first heat exchanger 31 and by a flow of accelerated air coming from the turbomachine T via the air supply duct A1. The temperature of the fuel and air is regulated by the various heat exchangers 31, 41, 32 and 43 as described above, so that the fuel cell P is supplied under optimum conditions during all phases of flight.

The method comprises the steps of transmitting calories coming from the fuel cell P to the fuel flow Q in order to heat it by means of the first exchanger 31, and then transmitting calories coming from the turbomachine T to the fuel flow Q in order to heat it by means of the second heat exchanger 32. The calories from the fuel cell P is used optimally so as to condition the fuel for the turbomachine T, the second heat exchanger 32 provides a final heating as close as possible to the turbomachine T.

The mechanical energy provided by the turbomachine T is used primarily to propel the aircraft, while the electrical energy provided by the fuel cell P is used to supply the electrical network 90 of the aircraft, but can also be used for propulsion.

The invention claimed is:

1. A fuel conditioning system configured to supply a turbomachine configured to provide propulsion for an aircraft with fuel coming from a cryogenic tank, the conditioning system comprising:
   a fuel circuit connected at an inlet to the cryogenic tank and at an outlet to the turbomachine,
   a pump configured to circulate a fuel flow from upstream to downstream in the fuel circuit,
   a fuel cell configured to provide electricity to an electrical network of the aircraft,
   at least one first heat exchanger belonging to the fuel circuit and configured to transmit calories coming from the fuel cell to the fuel flow in order to heat the fuel flow, and
   at least one second heat exchanger, mounted downstream of the first heat exchanger in the fuel circuit, configured to transmit calories coming from the turbomachine to the fuel flow in order to heat the fuel flow, wherein the conditioning system comprises a bypass duct including a bypass valve and a computer configured to control the bypass valve to allow a supply of the fuel to the second heat exchanger without supplying the first heat exchanger so as to regulate the heating of the fuel when fuel requirements increase during a flight phase by ensuring that the fuel is optimally heated despite an increased fuel flow during a flight phase.

2. The fuel conditioning system according to claim 1, further comprising a heat transfer fluid circuit in which a heat transfer fluid for cooling the fuel cell circulates, the first heat exchanger belonging to the heat transfer fluid circuit.

3. The fuel conditioning system according to claim 2, wherein the heat transfer fluid circuit comprises a primary load-shedding branch, comprising a primary load-shedding exchanger which allows a regulation of the heat input provided to the first heat exchanger.

4. The fuel conditioning system according to claim 1, wherein the bypass valve allows an amount of the fuel which is provided directly to the first heat exchanger and directly to the second heat exchanger to be regulated.

5. The fuel conditioning system according to claim 1, wherein the fuel cell is supplied by the fuel circuit by a fraction of the fuel flow previously heated by the first exchanger.

6. The fuel conditioning system according to claim 1, wherein the conditioning system comprises an air supply duct, which connects the turbomachine to the fuel cell, in order to supply the fuel cell with a flow of pressurised air coming from the turbomachine.

7. The fuel conditioning system according to claim 6, wherein the air supply duct comprises an auxiliary branch which comprises an auxiliary heat exchanger so as to regulate the temperature of the air flow provided to the fuel cell.

8. The fuel conditioning system according to claim 1, further comprising a propulsion member and a drive system for driving said propulsion member, the drive system being configured to be supplied by the turbomachine and by the fuel cell.

9. The fuel conditioning system according to claim 1, wherein the fuel is dihydrogen.

10. A method for supplying fuel to a turbomachine configured to ensure the propulsion of an aircraft with fuel coming from a cryogenic tank, the aircraft comprising a conditioning system according to claim 1, the method comprising:
    circulating a fuel flow from upstream to downstream in the fuel circuit by means of the pump to supply the turbomachine,
    providing electricity to the electrical network of the aircraft with the fuel cell,
    transmitting calories coming from the fuel cell to the fuel flow in order to heat the fuel flow with the first heat exchanger, then
    transmitting calories coming from the turbomachine to the fuel flow in order to heat the fuel flow with the second heat exchanger.

11. A fuel conditioning system configured to supply a turbomachine configured to provide propulsion for an aircraft with fuel coming from a cryogenic tank, the conditioning system comprising: a fuel circuit connected at an inlet to the cryogenic tank and at an outlet to the turbomachine, a pump configured to circulate a fuel flow from upstream to downstream in the fuel circuit, a fuel cell configured to provide electricity to an electrical network of the aircraft, at least one first heat exchanger belonging to the fuel circuit and configured to transmit calories coming from the fuel cell to the fuel flow in order to heat the fuel flow, and at least one second heat exchanger, mounted downstream of the first heat exchanger in the fuel circuit, configured to transmit calories coming from the turbomachine to the fuel flow in order to heat the fuel flow, wherein the conditioning system comprises a bypass duct allowing a supply of the fuel to the second heat exchanger without supplying the first heat exchanger, and wherein the bypass duct comprises a bypass valve regulating the fuel flow therethrough, and a computer that is configured to control the bypass valve as a function of the fuel flow rate and the temperature of the fuel leaving the first heat exchanger.

* * * * *